United States Patent
Otawa et al.

(10) Patent No.: US 6,864,008 B2
(45) Date of Patent: Mar. 8, 2005

(54) SEPARATOR FOR A FUEL CELL AND MANUFACTURING METHOD OF THE SEPARATOR

(75) Inventors: Kazuhiko Otawa, Osaka (JP); Shoji Kato, Sanda (JP); Katsunori Sugita, Sanda (JP)

(73) Assignees: Nippon Pilllar Packing Co., Ltd., Osaka (JP); Toyota Jidosha Kabushiki Kaisha, Aichi-ken (JP)

( * ) Notice: Subject to any disclaimer, the term of this patent is extended or adjusted under 35 U.S.C. 154(b) by 379 days.

(21) Appl. No.: 10/029,231

(22) Filed: Dec. 20, 2001

(65) Prior Publication Data

US 2002/0146613 A1 Oct. 10, 2002

(30) Foreign Application Priority Data

Dec. 22, 2000 (JP) ........................................ 2000-391422

(51) Int. Cl.$^7$ .............................. H01M 8/02; C08J 5/00; H01B 1/24

(52) U.S. Cl. ..................... 429/34; 264/331.11; 252/511

(58) Field of Search ............................. 429/32, 34, 35, 429/36, 37, 38; 264/330, 331.11; 252/511

(56) References Cited

U.S. PATENT DOCUMENTS

| 3,755,243 A | * | 8/1973 | Emanuelson et al. ....... 524/496 |
| 4,664,988 A | * | 5/1987 | Shigeta et al. ................ 429/44 |
| 4,737,421 A | | 4/1988 | Uemura et al. |
| 6,180,375 B1 | | 1/2001 | Braun et al. |
| 6,242,124 B1 | | 6/2001 | Saito et al. |
| 6,379,795 B1 | * | 4/2002 | Bisaria et al. ............ 429/34 X |
| 6,544,680 B1 | * | 4/2003 | Takano et al. ................ 429/34 |
| 2002/0004156 A1 | * | 1/2002 | Mizuno ........................ 429/34 |
| 2002/0064701 A1 | * | 5/2002 | Hand et al. ................... 429/34 |

\* cited by examiner

*Primary Examiner*—Stephen J. Kalafut
(74) *Attorney, Agent, or Firm*—Meyertons, Hood, Kivlin, Kowert & Goetzel, P.C.; Eric B. Meyertons

(57) ABSTRACT

To provide a separator for a fuel cell made of graphite excellent in mechanical strength and gas impermeability as well as electric characteristic properties, a separator for a fuel cell is produced from a molded body produced by filling a graphite powder 21 whose surface is coated with resin 20 in a molding die and by pressure-molding the powder. Such a molded body is provided with excellent mechanical strength of 40 MPa of bending strength or higher, $10\times10^{-8}$ cc·cm/cm$^2$·sec·atm of gas permeability or lower, and electric property of $10\times10^{-3}$ Ω·cm of the volume resistance or lower even if the content of resin is decreased to as low as 10 to 24 wt. %.

17 Claims, 2 Drawing Sheets

SEPARATOR FOR A FUEL CELL AND MANUFACTURING METHOD OF THE SEPARATOR

TECHNICAL FIELD

The present invention relates to a separator for a fuel cell and to a manufacture method of the separator.

BACKGROUND OF THE INVENTION

A fuel cell, for example, a solid polymer type is produced by composing unit cells each assembled by installing an anode and a cathode while sandwiching a solid polymer film between them and separators, and by stacking the unit cells in number of several hundreds. A fuel gas such as hydrogen or the like is supplied through a gas supply groove formed in one separator in anode side and an oxidizing gas such as oxygen or the like is supplied to the cathode side to cause electrochemical reaction to convert the chemical energy which the fuel has into the electric energy as output.

As a characteristic property as a material of the separators to be used for such a fuel cell, since electric current generated in each unit cell flows through the separators and respectively neighboring unit cells are assembled as to compose a structure in series connection in terms of a circuit by closely attaching the separators of the respective unit cells one another, the separators are required to have contact resistance as low as possible between surfaces of the neighboring separators and between the contact surfaces of the separators and the electrodes closely attached to the separators and are required to have the intrinsic resistance of the separators themselves (hereinafter referred also as to volume resistance) as low as possible as well.

Further, since the fuel gas and the oxidizing gas are supplied to the respective electrodes while being completely separated, gas impermeability in a high degree is required. Further, as described above, since a large number of unit cells are stuck to be assembled, the thickness of the separators is made as thin as possible and even if the separators are made thin as described, the separators are required to have sufficiently high mechanical strength and excellent molding precision as well from a viewpoint that fuel cells are assembled by stacking several hundreds of separators and fastening and fixing them.

As separators required to have such characteristic properties, well-known ones are isomg, for example, metal sheets of such as pure copper, a stainless steel and the like, however, in the case of such a metallic material, there is a problem that material deterioration is easy to be caused by hydrogen embrittlement owing to contact with hydrogen gas as a fuel gas and such a metal material is insufficient for a long time stability.

Therefore, those which have recently been developed are fuel cells employing a molded body produced by mixing a graphite powder with a thermosetting resin such as phenol resin as a binder and pressure molding the resulting mixture as separators. Since the graphite has a low electric resistance and excellent corrosion resistance, the above described problem in the case of using a metal can be improved. Further, since the void gaps formed in the inside of the compacted powder molded body are filled with the binder, gas impermeability to a certain extent can be obtained.

Such a separator made of graphite has conventionally been produced by, for example, using a resin-mixed graphite powder produced by steps of stirring thermosetting resin such as powder phenol resin with a volatile organic solvent such as an alcohol to obtain slurry, mixing and kneading a graphite powder with the slurry, drying the resulting mixture, and then pulverizing the dried mixture to a prescribed average particle diameter. In the above described pulverization step, the graphite powder whose surface is coated with the non-conductive resin by the kneading is pulverized and owing to that, produced is a raw material powder of graphite whose surface is exposed. Then, the raw material powder is filled in a prescribed molding die and pressure-molded to form a separator for a fuel cell.

In this case, the resin content is higher, the mechanical strength and the gas impermeability become more excellent. Consequently conventionally, a separator made of graphite has been produced by specifying at first the resin amount sufficient to satisfy the factors such as the mechanical strength and the gas impermeability necessary for a separator of a fuel cell.

However, a conventional separator made of graphite produced by the above described production method does not necessarily satisfy the electric characteristic properties such as volume resistance and the like. In other words, although the electric characteristic properties become more excellent as the resin amount is less, the resin amount cannot be decreased so much since the mechanical strength and the gas impermeability are decreased if the resin amount is decreased and for that, a conventional separator is not provided with excellent electric characteristic properties as well.

SUMMARY OF THE INVENTION

The present invention is developed taking the above described problem into consideration and the purpose is to provide a separator for a fuel cell made of a graphite and having mechanical strength and gas impermeability as well as electric characteristic properties and to provide a method for producing the separator.

The separator for a fuel cell of the present invention is made of a molded body produced by filling a molding die with a graphite powder coated with resin on the surface and molding the powder by applying pressure into a prescribed separate shape.

That is, a conventional separator made of graphite is produced by kneading resin and a graphite powder and then obtaining a raw material powder containing graphite whose surface is exposed by a pulverization step before the pressure-molding while taking the conductivity after the molding into consideration and pressure-molding the raw material powder. Consequently, resin partially attaches to the surface of the graphite and with a raw material powder in such a state, even if pressure-molding is carried out by a molding die filled with such a raw material powder, the isostatic fluidity of respective particles through resin cannot be obtained. That is, a graphite powder cannot sufficiently be coated with resin and for that, relatively large void gaps are easily left among the particles in a produced molded body. As a result, if the content of the resin is decreased, the strength and the gas impermeability are decreased.

On the other hand, the separator of this invention is produced by filling a molding die with a graphite powder whose surface is previously sufficiently coated with resin and by pressure-molding the powder, and in this case, the fluidity of the respective graphite particles is improved in the molding die to produce a molded body with a small porosity. Further, the neighboring graphite particles are closely stuck to one another while the resin being eliminated toward the voids among the graphite particles at the time of the pressure-molding and consequently, the conductivity among graphite particles is provided also at the pressure-molding.

As a result, pressure molding of, for example, a graphite powder coated with resin on the surface and having the particle diameter of 15 to 125 μM at the molding pressure of 100 to 1,000 kg/cm$^2$ and the molding temperature of 120 to 240° C. gives a molded body having 40 MPa of bending strength or higher and excellent in mechanical strength and $10\times10^{-8}$ cc·cm/cm$^2$·sec·atm of gas permeability or lower and $10\times10^{-3}$ Ωcm of the volume resistance or lower and excellent in electric characteristic properties even if the resin content is as low as 10 to 24 wt. % and the obtained molded body can suitably be used as a separator for a fuel cell.

DETAILED DESCRIPTION OF THE PREFERRED EMBODIMENTS

Figure 2:
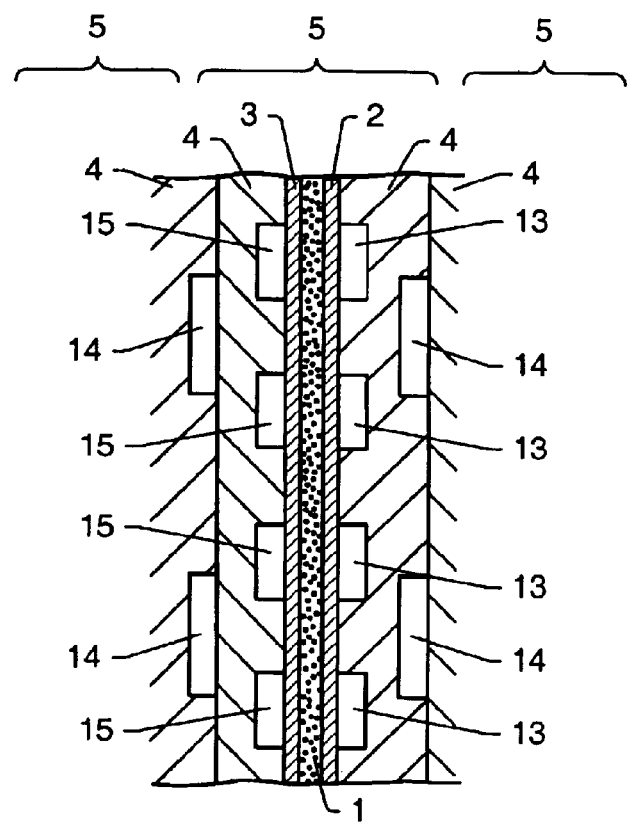
FIG. 2 is a schematic cross-sectional view showing the constitution of a fuel cell-based battery.

At first, the constitution and the operation of a solid polymer type fuel cell assembled using a separator according to the present invention will be described using a schematic figure of a general separator. As shown in FIG. 2, the fuel cell-based battery is assembled in a stack structure by stacking unit cells 5 in number of several hundreds, each composed of a solid polymer film 1, which is an ion exchange membrane made of fluoro resin, for example, an anode 2 and a cathode 3 sandwiching the solid polymer film 1 from both sides, and separators 4·4 further sandwiching them from both sides, and disposing current collector plates, which are omitted in the figure, in both sides of the united cells. Each anode 2 and each cathode 3 are made of carbon cloth woven from carbon fiber yarn, carbon paper, or carbon felt.

Figure 3:
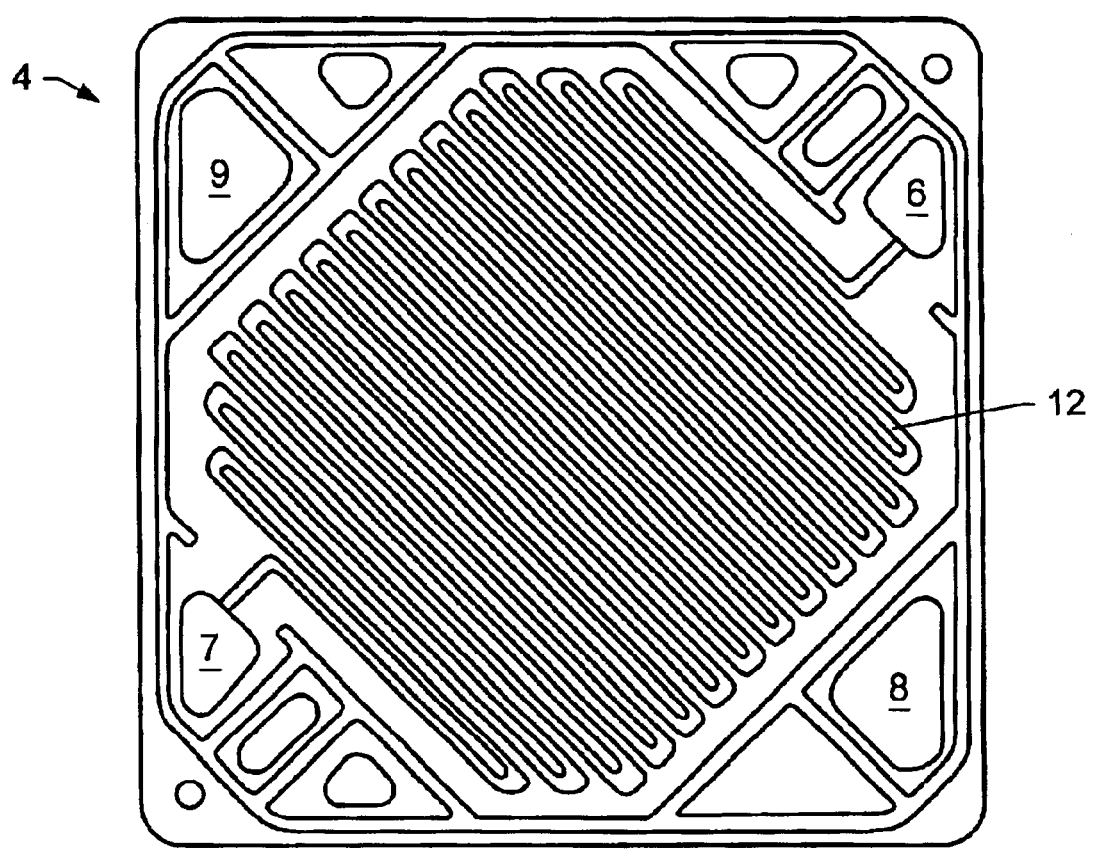
FIG. 3 is a front view of a separator incorporated in a unit cell.

As showing in FIG. 3, each separator 4 has fuel gas holes 6·7 and oxidizing gas holes 8·9 in the peripheral part to pass a hydrogen-containing fuel gas though and to pass an oxygen-containing oxidizing gas through, respectively. When the unit cells 5 are stacked, the respective holes 6 to 9 penetrate the inside of each fuel cell in the longitudinal direction to form a fuel gas supply manifold, a fuel gas discharge manifold, an oxidizing gas supply manifold, and an oxidizing gas discharge manifold.

In the inner side surface of the above described each hole 6 to 9, a flow channel of a groove part 12 with an optional pattern is formed. The pattern of the groove part 12 may be formed to be, for example, a lattice like shape among a large number of projected parts other than the shape illustrated in the figure. Through the groove part 12, as shown in FIG. 2 a fuel gas flow channel 13 is formed between the surface of an anode 2 and a separator 4 in the separator 4 in the anode 2 side and a cooling water flow channel 14 is formed between the separator 4 and another neighboring separator 4. On the other hand, in a separator 4 in a cathode 3 side, an oxidizing gas flow channel 15 is formed between the separator 4 and the surface of the cathode 3.

In such a fuel cell-based battery with the above described structure, a hydrogen-containing fuel gas is supplied from a fuel gas supply apparatus installed in the outside to the fuel gas flow channel 13 of each unit cell 5 through the above-described fuel gas supply manifold and in the anode 2 side of each unit cell 5, the electrochemical reaction; $H_2 \rightarrow 2H^+ + 2e^-$; is caused. The fuel gas after the reaction is discharged outside through the flue gas flow channel 13 of each unit cell 5 and the fuel gas discharge manifold.

At the same time, an oxygen-containing oxidizing gas (air) is supplied from an oxidizing gas supply apparatus installed in the outside to the oxidizing gas flow channel 15 of each unit cell 5 through the above described oxidizing gas supply manifold and in the anode 3 side of each unit cell 5, the electrochemical reaction; $O_2 + 4H^+ + 4e^- \rightarrow 2H_2O$; is caused. The oxidizing gas after the reaction is discharged outside through the oxidizing gas flow channel 15 of each unit cell 5 and the oxidizing gas discharge manifold.

Following the above described electrochemical reactions, as a whole the electrochemical reaction $2H_2 + O_2 \rightarrow 2H_2O$; proceeds and by the reaction, the chemical energy which the fuel has is converted to the electric energy and a prescribed battery function is performed. Incidentally, the fuel cell-based battery is operated in a temperature range of about 80 to 100° C. and during the operation, cooling water is supplied from a cooling water supply apparatus installed in the outside and circulated through the above described cooling water channel 14 to keep the operation temperature within the above described temperature range.

The said each separator 4 is formed generally to be a thin sheet-like shape with the thickness of about 1 to 3 mm and a groove part 12 with the depth of 0.3 to 1.5 mm is formed in both side in the case of a separator 4 in the anode 2 side and in one side in the case of a separator 4 in the cathode 3 side so as to form the said fuel gas flow channel 13, the cooling water flow channel 14, and the oxidizing gas flow channel 15.

A separator of the present invention to be employed for a solid polymer type fuel cell-based battery just as described above is made of a molded body produced by pressure-molding a graphite powder coated with resin on the surface into a prescribed separate shape under the molding conditions which will be described later. The molded body has excellent mechanical strength as 40 MPa of bending strength or higher, characteristic property as a material of $10\times10^{-8}$ cc·cm/cm$^2$·sec·atm of gas permeability or lower, and electric characteristic property of $10\times10^{-3}$ Ωcm of the volume resistance or lower although the content of resin in the molded body is about 10 to 24 wt. %, less than that of a conventional one. Hereinafter, the production method of such a separator made of graphite will be described.

At first, the graphite powder to be used may be any kind of graphite such as natural graphite, artificial graphite, carbon black, kish graphite, and expanded graphite, and the like and may optionally be selected while taking the conditions of such as the cost into consideration. Natural graphite and artificial graphite are preferable in terms of the electric properties. The average particle diameter of the graphite powder to be used is preferable in a range of 15 to 125 μm. If it is smaller than 15 μm, the electric resistance cannot sufficiently be decreased and if it is larger than 125 μm, the strength is deteriorated.

As the resin, most preferable is phenol resin excellent in wettability with the graphite powder and also preferable are any kind of resol type resin and novolak type resin.

The method for producing such a graphite powder coated with resin is not particularly restricted and, for example, a resin solution diluted with an organic solvent with a low viscosity such as methanol, for example, a phenol resin solution, is mixed with a graphite powder and stirred and kneaded to be a slurry and then the slurry is granulated and dried by a spray drier to produce such a graphite powder. In such a case, the mixing ratio at the above described mixing and kneading time is adjusted so as to control the resin content after the formation of the molded body to be 10 to 24 wt. %, preferably 14 to 18 wt. %. If the resin content is less than 10 wt. %, the excellent gas impermeability is difficult to be obtained and if the content is more than 24 wt. %, the volume resistance and the contact resistance, which will be described later, are increased.

Further, the resin-coated graphite powder can be produced by a method in which polymerization reaction of resin takes place on the surface of the graphite powder during the stirring of the resin raw material solution. For example, in the case of forming phenol resin coating, a graphite powder is further added to a reaction container loaded with phenols, formaldehydes, a reaction catalyst, and another general reaction solvent and the mixture is heated to a prescribed temperature while being mixed and stirred to produce a resin-coated graphite powder in which the phenol resin adheres to the surface of the graphite powder and enters in lamellar graphite powder to firmly stick to the graphite powder.

Incidentally, the said phenols denote phenol and phenol derivatives and other than phenol, examples are trifunctional ones such as m-cresol, resorcinol, and 3,5-xylenol; tetrafunctional ones such as bisphenol A, and dihydroxydiphenylmethane; bifunctional o- or p-substituted phenol such as o-cresol, p-cresol, p-tert-butylphenol, p-phenylphenol, p-cumylphenol, p-nonylphenol, 2,4- or 2,6-xylenol, and the like. Further, halophenols having chlorine or bromine as a substitutent are also usable and other than using solely one selected from those, a plurality of those compounds may be used as a mixture.

As the formaldehydes, formalin is most suitable and those in form of paraformaldehyde may be used and besides, some or most of formaldehyde may be substituted with furfural or furfuryl alcohol to be used.

As the reaction catalyst, preferable are those capable of producing —$NCH_2$, or —$OCH_2$ or —$SCH_2$ bond between the benzene ring of the phenols and a benzene ring as a final structural formula of the phenol resin. For example, usable are hexamethylene tetramine, ammonia, and basic substances such as primary and secondary amines, e.g. methylamine, dimethylamine, ethylenediamine, monoethanolamine and the like. Further together with these, it is also possible to use a basic catalyst such as hydroxides of alkali metals and alkaline earth metals and tertiary amines, which are commonly used at the time of phenol resin synthesis.

The following reaction formulas shown as Chem. 1 and Chem. 2 are examples of the general reaction formulas:

Chem.1

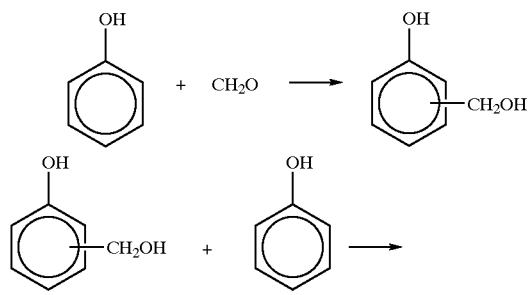

-continued

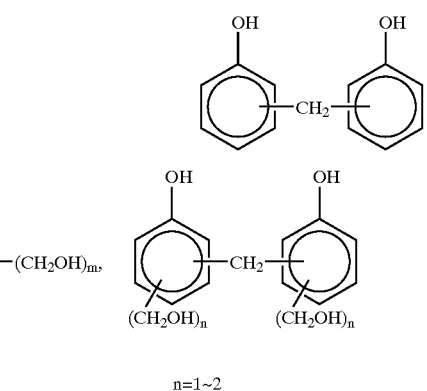

Chem. 2

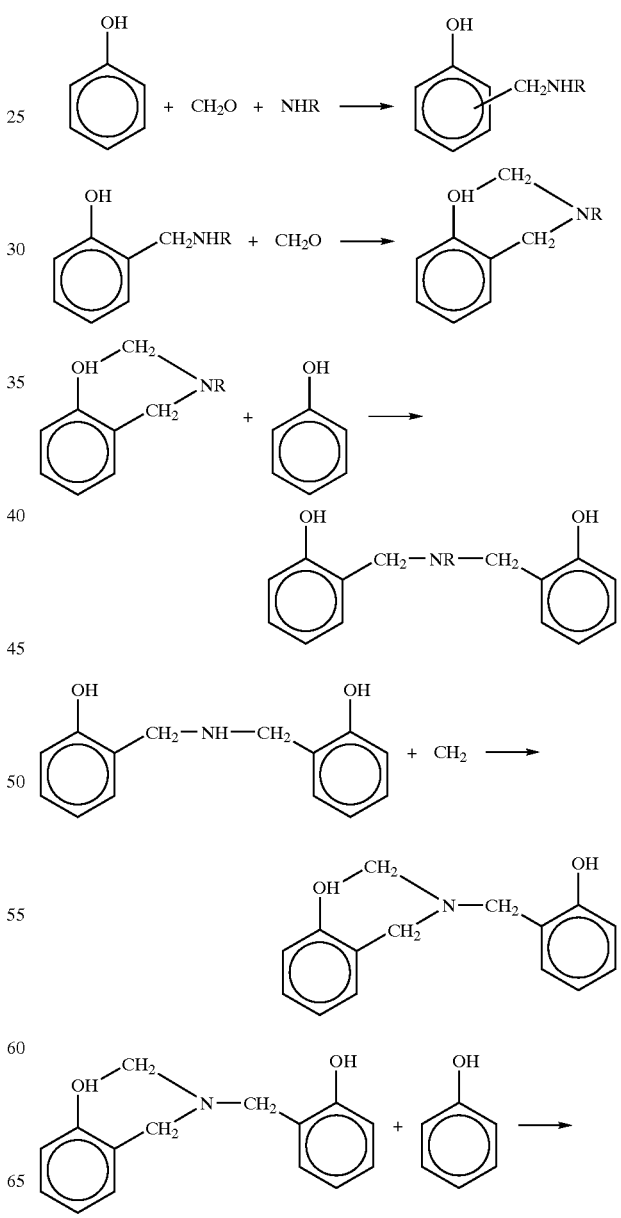

-continued

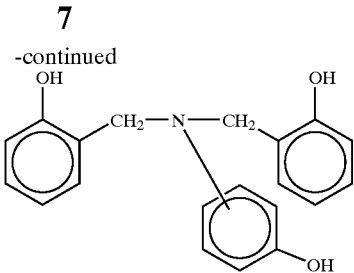

(in the formula, the reference character R denotes hydrogen or a lower alkyl such methyl, ethyl and the like.).

The phenol resin obtained is phenol resin having —SCH$_2$ bond between benzene rings other than the phenol resin shown as Chem. 1 and Chem. 2.

These phenols, formaldehydes, and the reaction catalysts are loaded to a reaction container such as a reaction vessel and further a graphite powder is added and then the reaction of the phenol and the formaldehydes is caused in the presence of the graphite powder. Consequently, a resin-coated graphite powder in which phenol resin firmly adheres to the surface of the graphite powder can be obtained.

The resin-coated graphite powder obtained by the above described production method is filled in a die having a molding space corresponding to a prescribed separator shape and pressure-molded in molding conditions molding pressure of 100 to 1,000 kg/cm$^2$ and molding temperature of 120 to 240° C. If the molding pressure is lower than 100 kg/cm$^2$, the density of the obtained molded body is low and the volume resistance becomes high to make a separator excellent in conductivity hard to be obtained. On the other hand, if excess plane pressure higher than 1,000 kg/cm$^2$ is applied, the phenomenon that resin is extruded out the graphite particles and unevenly distributed in the peripheral regions of the molded body dominantly takes place and for that the contact resistance, which will be described later, is increased.

Although the molding temperature can property be set corresponding to the heating properties of the resin, it is preferable to set the temperature generally at 120° C. or higher as described above in order to obtain the good fluidity of the graphite powder and the good molding property in the molding die in the case the resin content is small. If the temperature exceeds 240° C., the swelling phenomenon of the molded body occurs and if the temperature is further increased, resin carbonization takes place.

Figure 1:
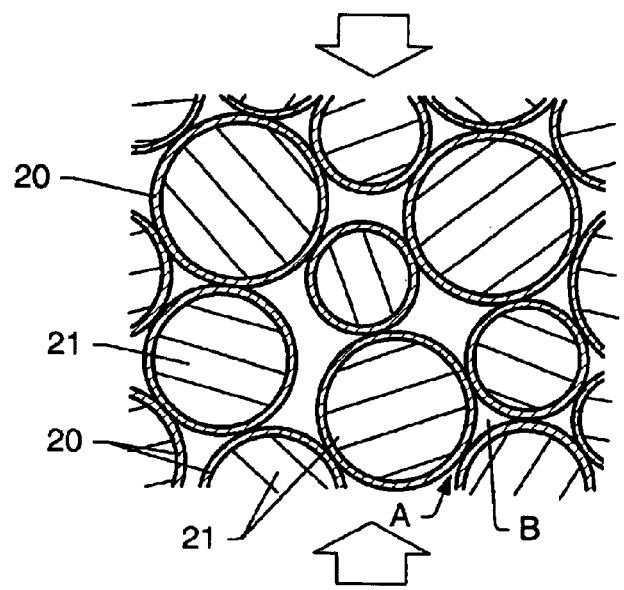
FIG. 1 is a schematic cross-sectional view showing the filling and pressurizing state of a resin-coated graphite powder in a molding die in the production process of a separator for a fuel cell of the present invention.

As described, the separator of the present invention, as shown schematically in FIG. 1, can be produced using a graphite powder 21 whose surface coated with resin 20 by filling a molding die with the graphite powder and molding the graphite powder in the above described molding conditions. In the pressure-molding process, owing to the resin softened at first by heating, the respective graphite particles show fluidity responding to the resin in the molding die and due to that, the obtained molded body is well fitted with the die even after the resin is hardened, that is, the obtained molded body is provided with a high shape precision.

Further, the resin 20 covering the surface of the respective raw material graphite particles 21 flows toward the voids B among the respective raw material graphite particles 21 along the surface of the respective raw material graphite particles 21 in the regions A among the respective raw material graphite particles 21 contacting one another during the molding pressure application. As a result, the surfaces of neighboring raw material graphite particles 21 are brought into contact with one another and good electric communication state is produced among these raw material graphite particles 21. Further, the resin extruded out the regions where particles are brought into contact with one another as describe above gathers in gaps surrounded with the respective raw material graphite particles 21 to fill the gaps. In such a manner, fluidity of the resin 20 is evenly generated around the respective raw material graphite particles 21 entirely in the inside of the molding die, so that the respective raw material graphite particles 21 surrounding the gaps are also firmly bonded to one another through the resin filling the gaps to form a molded body.

In such a manner, even if the content of the resin is decreased, using raw material graphite particles whose surface are respectively coated with the resin makes it possible to obtain a molded body in which gaps formed among the respective raw material graphite particles are almost completely filled with the resin and consequently, such a molded body excellent in mechanical strength and having a low gas permeability can be produced.

Moreover, under the above described pressure-molding conditions, since the resin is discharged to the gaps among the raw material graphite particles 21 from neighboring regions of the raw material graphite particles 21 to bring these raw material graphite particles 21 into contact with one another to obtain excellent electric communication state, it is made possible to obtain a molded body excellent also in the electric characteristic property of the volume resistance of $10 \times 10^{-3}$ Ωcm or lower attributed also to the low resin content as a whole.

Especially, as described above, in the fuel cell-based battery composed by stacking unit cells 5 in number of several hundreds, the inner resistance is considerably affected by the contact resistance between mutually closely attached separators in neighboring unit cells 5·5 in addition to the volume resistance of the separator itself. In the case of the separator made of graphite of the present invention, such a contact resistance is also extremely low. That is, in the case of a conventional separator made of graphite, the resin content cannot be decreased to, for example, around 30 wt. % or lower because of the above described reasons and at the time when a graphite powder mixed with such a high amount of the resin is pressure-molded, the resin is extruded out to the peripheral part of the molded body from the gaps among the graphite particles to increase the resin ratio in the surface of the molded body. As a result, the separator has a high contact resistance as described above.

On the other hand, in the case of the separator of the present invention, even if the resin content is decreased to 24 wt. % or lower, the desired mechanical strength and gas impermeability can be maintained, and the separator obtained is provided with a low contact resistance as described above. Consequently, using such a separator, a fuel cell-based battery with low inner resistance and high power generation efficiency can be assembled. Further, the thickness of the separator can be made thin and consequently, the fuel cell-based battery can be made small and light in weight.

EXAMPLES

Hereinafter, the present invention will be described along with examples, however the present invention is not at all restricted to these examples or the above described embodiments and possible to be variously modified within the true scope of the invention.

Example 1

A reaction container was loaded with a graphite powder with the average particle size of 100 μm, phenol, formaldehyde, reaction catalyst (hexamethylenetetramine or ammonia together with a caustic soda solution), and a reaction solvent and while being mixed and stirred, the mixture was heated at 80° C. for 1 hour. The content of the reaction container was cooled to a room temperature and after the stirring was stopped, the black granular substance precipitated separately from the solvent in the reaction container was discharged out and washed with water. The resulting substance was filtered to be separated from the solvent and dried to obtain a resin-coated graphite powder. The content of the resin in the resin-coated graphite was 14%.

Then, the resin-coated graphite powder was filled in a molding die and pressure-molded at molding pressure of 200 kg/cm$^2$ and molding temperature of 160° C. to produce a specimen for measuring a variety of characteristic properties, which will be described later.

Example 2

A resin-coated graphite powder was produced in the same manner as the example 1, except that the raw material graphite powder with the average particle diameter of 60 μm was used in place of the graphite powder in the example 1. The content of the resin in the resin-coated graphite was 18%. Next, using the obtained resin-coated graphite powder, a specimen was produced in the same molding manner as described above in the same molding conditions as those of the example 1.

Example 3

A resin-coated graphite powder was produced in the same manner as the example 1, except that the raw material graphite powder with the average particle diameter of 45 μm was used in place of the graphite powder in the example 1. The content of the resin in the resin-coated graphite was 21%. Next, using the obtained resin-coated graphite powder, a specimen was produced in the same molding manner as described above in the same molding conditions as those of the example 1.

Comparative Example 1

A resin-coated graphite powder was produced in the same manner as the example 1, except that the raw material graphite powder with the average particle diameter of 25 μm was used in place of the graphite powder in the example 1. The content of the resin in the resin-coated graphite was 25%. Next, using the obtained resin-coated graphite powder, a specimen was produced in the same molding manner as described above in the same molding conditions as those of the example 1.

Comparative Example 2

A resin-coated graphite powder was produced in the same manner as the example 1, except that the raw material graphite powder with the average particle diameter of 130 μm was used in place of the graphite powder in the example 1. The content of the resin in the resin-coated graphite was 8%. Next, using the obtained resin-coated graphite powder, a specimen was produced in the same molding manner as described above in the same molding conditions as those of the example 1.

Comparative Example 3

After powdery phenol resin was pulverized and mixed by a ball mill, methanol was added to obtain a slurry of the phenol resin and the slurry was mixed with a raw material graphite powder with the average particle diameter of 125 μm similar to that of the example 1 and after being stirred at 60° C. for drying, the resulting mixture was pulverized by a mixer to obtain a resin-graphite mixed powder. Additionally, magnesium stearate was added in the middle in the pulverizing and mixing step of the phenol resin.

The content of the resin in the resin-graphite mixed powder obtained in the above described manner was 18% and using the obtained mixed powder, a specimen was produced in the same pressure-molding manner as described above in the same molding conditions as those of the example 1.

Using the respective specimens obtained in examples 1 to 3 and comparative examples 1 to 3, the compressive strength, the bending strength, the contact resistance, the intrinsic resistance, and the gas permeability were measured according to the following respective measurement methods. Results are shown in Table 1.

Measurement method:

(1) compressive strength measured according to JIS K 7208 (specimen: 10 mm square×4 mm height);

(2) bending strength measured according to JIS K 7203 (specimen: 10 mm width×4 mm height×80 mm length);

(3) contact resistance voltage was measured by laminating two specimens (20 mm square×1 mm thickness) between measurement electrodes, applying and contact plane pressure of 25 kg/cm$^2$, and applying electric current of 1 A and then contact resistance was calculated;

(4) intrinsic resistance volume resistivity was measured according to JIS K 7194 (2 mm plate thickness); and (5) gas permeability gas permeation amount of nitrogen gas was measured while the pressure difference of 1 atm being generated between both sides of a specimen and the gas permeability was calculated.

TABLE 1

| | graphite average particle diameter μm | resin content % | compressive strength MPa | bending strength MPa | contact resistance Ω cm$^2$ | intrinsic resistance Ω cm | gas permeability $\frac{cc \cdot cm}{cm^2 \cdot s \cdot atm}$ |
|---|---|---|---|---|---|---|---|
| example | | | | | | | |
| 1 | 100 | 14 | 62 | 44 | 5 × 10$^{-3}$ | 3 × 10$^{-3}$ | not higher than 5 × 10$^{-6}$ |

TABLE 1-continued

| graphite average particle diameter μm | resin content % | compressive strength MPa | bending strength MPa | contact resistance Ω cm² | intrinsic resistance Ω cm | gas permeability $\frac{cc \cdot cm}{cm^2 \cdot s \cdot atm}$ |
|---|---|---|---|---|---|---|
| 2 | 60 | 18 | 81 | 49 | $8 \times 10^{-3}$ | $6 \times 10^{-3}$ | not higher than $5 \times 10^{-6}$ |
| 3 | 45 | 21 | 94 | 53 | $8 \times 10^{-3}$ | $6 \times 10^{-3}$ | not higher than $5 \times 10^{-6}$ |
| comparative example | | | | | | | |
| 1 | 25 | 25 | 113 | 60 | $15 \times 10^{-3}$ | $11 \times 10^{-3}$ | not higher than $5 \times 10^{-6}$ |
| 2 | 130 | 8 | 50 | 30 | $5 \times 10^{-3}$ | $3 \times 10^{-3}$ | $5 \times 10^{-6}$ |
| 3 | 125 | 18 | 60 | 38 | $10 \times 10^{-3}$ | $8.7 \times 10^{-3}$ | $5 \times 10^{-3}$ |

As showing in Table 1, even if the resin-coated graphite powder is used, the contact resistance and the intrinsic resistance were high in the comparative example 1 where the resin content exceeds 24 wt. % and the compressive strength and the bending strength were low and the gas permeability was high in the comparative example 2 where the resin content less than 10 wt. %. On the other hand, in the comparative example 3 where used in place of the resin-coated graphite powder was the resin-graphite mixed powder produced by adding a graphite powder to resin stirring them and then pulverizing the resulting mixture, the bending strength was low and the specimen was inferior in gas permeability as well as the contact resistance and the intrinsic resistance.

Contrary, in the examples 1 to 3 where resin-coated graphite powders with the average particle diameter of 10 to 125 μm and the resin content of 10 to 24 wt. %, molded bodies obtained were excellent in the compressive strength and bending strength and had low contact resistance and intrinsic resistance.

Incidentally, further specimens (1.5 mm thickness×250 mm length×250 mm width) for molding precision were produced and the thickness was measured at 25 points of a lattice and the average value and the difference of the respective measured values from the average value were calculated to evaluate the molding precision and any specimen of the examples 1 to 3 was found the thickness precision within ±15 μm or lower, also showing excellent molding precision.

As described above, since the separator of the present invention produced by pressure-molding a graphite powder whose surface is coated with resin has excellent mechanical strength, the gas impermeability and the electric characteristic properties, a fuel cell-based battery with excellent capability can be produced using the molded body.

What is claimed is:

1. A separator for a fuel cell, comprising a molded body, wherein the molded body is produced by the method comprising:
    mixing and reacting phenols, formaldehydes and graphite powder with a reaction catalyst to produce a phenol resin-coated graphite powder; and
    pressure molding the resin-coated graphite powder into the shape of the molded body;
    wherein the structure of the phenol resin comprises —NH$_2$, —OCH$_2$ or —SCH$_2$ bonding between the benzene nucleus of phenols, and wherein the resin-coated graphite powder has an average diameter of from about 15 μm to about 125 μm, and wherein the molded body comprises a resin content of from about 10 wt. % to about 24 wt. %.

2. The separator of claim 1, wherein the molded body comprises a bending strength of 40 MPa or higher, a gas permeability of 10×10$^{-8}$ cc·cm/cm²·sec·atm or lower, and a volume resistance of 10×10$^{-3}$ Ω·cm or lower.

3. The separator of claim 1, wherein the molded body comprises a resin content of about 14 wt. % to 18 wt. %.

4. The separator of claim 1, wherein the graphite powder comprises graphite particles, and wherein gaps between the graphite particles are filled with the phenol resin.

5. The separator of claim 1, wherein the separator comprises a thickness of about 1 mm to 3 mm.

6. A method for forming a separator for a fuel cell comprising:
    mixing and reacting phenols, formaldehydes and graphite powder with a reaction catalyst to produce a phenol resin-coated graphite powder; and
    pressure molding the phenol resin-coated graphite powder into the form of the separator at a molding pressure of from about 100 kg/cm² to about 1000 kg/cm² and a temperature of from about 120° C. to 240° C.
    wherein the structure of the phenol resin comprises —NH$_2$, —OCH$_2$ or —SCH$_2$ bonding between the benzene nucleus of phenols, and wherein the phenol resin-coated graphite powder has an average diameter of 15 to 125 μm.

7. The method of claim 6, wherein the separator has a resin content of less than about 24 wt. %.

8. The method of claim 6, further comprising filling a molding die with the resin-coated graphite powder prior to pressure-molding the resin-coated graphite powder, wherein the molding die comprises the prescribed separator shape.

9. The method of claim 6, wherein the resin-coated graphite powder comprises graphite particles, and wherein gaps between the graphite particles are substantially filled with the resin.

10. A separator for a fuel cell comprising a molded body, wherein the molded body is produced by the method comprising:

mixing and reacting phenols, formaldehydes and graphite powder with a reaction catalyst to produce a phenol resin-coated graphite powder; and pressure molding the resin-coated graphite powder into the shape of the molded body.

11. The separator of claim 10, wherein the molded body comprises a resin content from about 10 wt. % to about 24 wt. %.

12. The separator of claim 10, wherein the phenol resin-coated graphite powder has an average diameter of from about 15 µm to about 125 µm.

13. The separator of claim 10, wherein the structure of phenol resin comprises —$NCH_2$, —$OCH_2$, or —$SCH_2$ bonding between the benzene nucleus of phenols.

14. A method for forming a separator for a fuel cell comprising the steps:

mixing and reacting phenols, formaldehydes and graphite powder with a reaction catalyst to produce a phenol resin-coated graphite powder; and pressure molding the phenol resin-coated graphite powder into the form of the separator.

15. The method of claim 14, wherein the resin-coated graphite powder has an average diameter of 15 to 125 µm.

16. The method of claim 14, wherein the structure of the phenol resin comprises —$NH_2$, —$OCH_2$ or —$SCH_2$ bonding between the benzene nucleus of phenols.

17. The method of claim 14, wherein the pressure molding is performed at a molding pressure of from about 100 kg/cm$^2$ to about 1000 kg/cm$^2$ and a temperature of from about 120° C. to 240° C.

* * * * *